United States Patent
Hong

(10) Patent No.: US 8,041,192 B2
(45) Date of Patent: Oct. 18, 2011

(54) IMAGE RECEIVING APPARATUS FOR TRANSMITTING DATA TO AND RECEIVING DATA FROM REMOVABLE PVR DEVICE AND DATA TRANSMISSION AND RECEPTION METHOD THEREOF

(75) Inventor: Joo-sun Hong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1236 days.

(21) Appl. No.: 11/730,228

(22) Filed: Mar. 30, 2007

(65) Prior Publication Data
US 2008/0025705 A1    Jan. 31, 2008

(30) Foreign Application Priority Data
Jul. 27, 2006   (KR) .................. 10-2006-0070896

(51) Int. Cl.
*H04N 5/84* (2006.01)
(52) U.S. Cl. ........................................ 386/332; 386/334
(58) Field of Classification Search .................. 386/332, 386/334, 200, 291, 326
See application file for complete search history.

(56) References Cited

U.S. PATENT DOCUMENTS
5,377,051 A * 12/1994 Lane et al. .................... 386/314
5,541,738 A *  7/1996 Mankovitz .................... 386/245
* cited by examiner

*Primary Examiner* — Robert Chevalier
(74) *Attorney, Agent, or Firm* — Sughrue Mion, PLLC

(57) ABSTRACT

An image receiving apparatus for transmitting data to and receiving data from a removable PVR device, and a data transmission and reception method thereof are disclosed. The image receiving apparatus includes an interface which transmits AV data and data corresponding to user commands to an external recording device, and a controller which inserts the data corresponding to the user commands into a stream containing the AV data and transmits the stream to the external recording device through the interface. Therefore, the general-purpose communication lines and data lines may be simplified so that the AV data can be easily stored and reproduced in a removable (hard disk drive) HDD.

27 Claims, 3 Drawing Sheets

IMAGE RECEIVING APPARATUS FOR TRANSMITTING DATA TO AND RECEIVING DATA FROM REMOVABLE PVR DEVICE AND DATA TRANSMISSION AND RECEPTION METHOD THEREOF

CROSS-REFERENCE TO RELATED APPLICATIONS

This application claims the benefit under 35 U.S.C. §119 (a) of Korean Patent Application No. 10-2006-0070896, filed on Jul. 27, 2006, in the Korean Intellectual Property Office, the entire disclosure of which is hereby incorporated by reference.

BACKGROUND OF THE INVENTION

1. Field of the Invention

Devices and methods consistent with the present invention relate to an image receiving apparatus for transmitting data to and receiving data from a removable personal video recorder (PVR) device, and a data transmission and reception method thereof, and more particularly, to an image receiving apparatus for transmitting and receiving data using a transport stream (TS) data structure when recording and reproducing audio/video (AV) data in a removable PVR device connected to the image receiving apparatus through a low voltage differential signaling (LVDS) cable, and a data transmission and reception method thereof.

2. Description of the Related Art

As digital broadcasting has advanced, display apparatuses for displaying high-definition images and PVR devices with video recording capability have continually developed. PVR devices record and reproduce broadcast signals on high capacity hard disks. More specifically, PVR devices can record moving pictures without videotapes. Also, PVR devices can record moving pictures with a high definition that is five times more detailed than analog broadcasts.

Accordingly, using PVR devices it is possible to store digital broadcast programs, reproduce them with the quality of live broadcast programs without reproducing apparatuses, such as video cassette recorders (VCRs), and record many programs at the same time. Additionally, PVR devices can perform convenient functions such as high-speed reproduction, editing, repeat reproduction or the like, because the broadcast program is reproduced by a file reproducing method. A program viewing schedule may be adjusted according to individual preference using the PVR device, so that it is possible for a user to watch desired programs with the quality of live broadcast programs no matter when the user is watching them.

An image receiving apparatus for receiving broadcast signals and various image signals may include the PVR device that supplies the PVR functions and is provided inside the image receiving apparatus or outside the image receiving apparatus.

In a related art image receiving apparatus that uses a PVR device disposed on the outside thereof, data of the Advanced Technology Attachment (ATA) standard (40 pin) is transmitted. However, if the length of a cable connecting the removable PVR device to the image receiving apparatus is increased, there is no impedance matching and, therefore, errors may be occur when receiving and transmitting data.

Additionally, in order to transmit data between the related art image receiving apparatus and the removable PVR device, the conventional image receiving apparatus and the removable PVR device need to be connected through a data line following ATA standards for transmitting the AV data, and a communication line providing an RS-232 interface for transmitting commands, such as recording, reproducing, or the like. Furthermore, when the AV data stored in the removable PVR device is transmitted to the image receiving apparatus, the related art image receiving apparatus and the removable PVR device need to be further connected through a data line providing a high definition multimedia interface (HDMI) for transmitting the read AV data. Therefore, it is necessary to include three physical cables providing various interfaces for communicating between the image receiving apparatus and the removable PVR device.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to one aspect of the present invention, there is provided an image receiving apparatus is provided, which includes an interface which transmits AV data and data corresponding to the user commands to an external recording device, and a controller which inserts the data corresponding to the user commands into a stream containing the AV data and transmits the stream to the external recording device through the interface.

Specifically, the controller may transmit the stream, which includes the AV data inserted into a section having a control signal at a first level and the data corresponding to the user commands inserted into a section having the control signal at a second level, to the external recording device.

In an exemplary implementation, the control signal may be a valid signal, the first level may be a logical level '1', and the second level may be a logical level '0'.

In an exemplary implementation, the image receiving apparatus may be connected to the external recording device through one serial cable. At this time, the serial cable is a low voltage differential signaling (LVDS) cable.

The external recording device may be a removable personal video recorder (PVR) device. Specifically, the external recording device may include a communication interface which receives the stream, in which data corresponding to user commands is inserted into the stream containing the AV data, from the interface; a hard disk which stores the AV data; and a central processing unit which separates the AV data and the data corresponding to the user commands from the stream and stores the separated AV data in the hard disk according to the user commands.

If the user command is a reproducing command, the central processing unit may insert data containing storage information into the stream containing the AV data stored in the hard disk and transmit the stream to the image receiving apparatus.

In an exemplary implementation, the controller may insert the data corresponding to the user commands into a stream not containing the AV data.

In an exemplary implementation, the stream may be a transport stream (TS).

In an exemplary implementation, 4 or more bytes of the user command data may be inserted into the section having the control signal at the second level.

According to one exemplary aspect of the present invention, there is provided a data transmission and reception method of an image receiving apparatus, which includes inserting data corresponding to user commands into a stream containing AV data, and transmitting the stream, into which the data corresponding to the user commands are inserted, to an external recording device.

More specifically, in an exemplary implementation, the transmitting may include transmitting the stream, in which the AV data is inserted into a section having a control signal at a first level and the data corresponding to the user commands is inserted into a section having the control signal at a second level, to the external recording device.

In an exemplary implementation, the control signal may be a valid signal, the first level may be a logical level '1', and the second level may be a logical level '0'.

In an exemplary implementation, the image receiving apparatus may be connected to the external recording device through one serial cable. At this time, the serial cable is a lower voltage differential signaling (LVDS) cable.

In an exemplary implementation, the external recording device may be a removable personal video recorder (PVR) device.

If the user command is a reproducing command, the external recording device may insert data containing storage information or the like into the stream containing the stored AV data and transmit the stream to the image receiving apparatus.

In an exemplary implementation, the stream may be a transport stream (TS).

In an exemplary implementation, 4 or more bytes of the user command data may be inserted into the section having the control signal at the second level.

According to one exemplary aspect of the present invention, there is provided a removable PVR system, which includes a removable PVR device which stores AV data, and an image receiving apparatus which inserts data corresponding to user commands into a stream containing the AV data and transmits the stream to the removable PVR device.

In an exemplary implementation, the image receiving apparatus may transmit the stream, which includes the AV data inserted into a section having a control signal at a first level and the data corresponding to the user commands inserted into a section having the control signal at a second level, to the removable PVR device.

In an exemplary implementation, the control signal may be a valid signal, the first level may be a logical level '1', and the second level may be a logical level '0'.

In an exemplary implementation, the removable PVR device may separate the AV data and the user command data contained in the stream which is received from the image receiving apparatus and store the separated AV data.

In an exemplary implementation, if the data corresponding to the user commands is a reproducing command, the removable PVR device may transmit the stream, which includes the stored AV data inserted into the section having the control signal at the first level and the data corresponding to storage information and additional information inserted into the section having the control signal at the second level, to the image receiving apparatus.

BRIEF DESCRIPTION OF THE DRAWINGS

The above aspects and features of the present invention will be more apparent by describing certain exemplary embodiments of the present invention with reference to the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Hereinafter, exemplary embodiments of the present invention will be described in detail with reference to the accompanying drawings.

Figure 1:
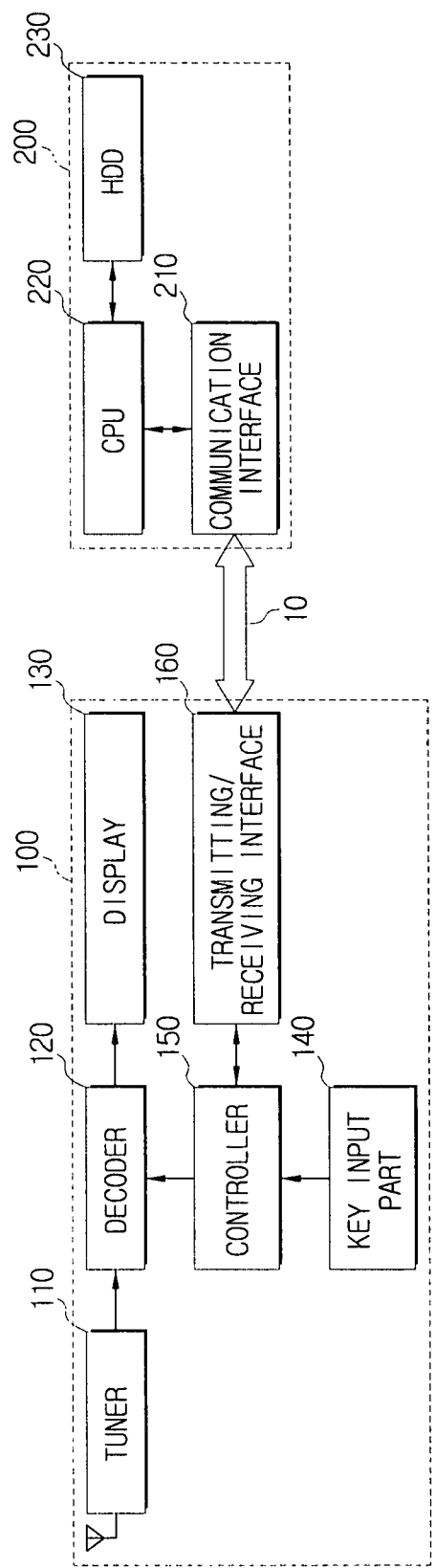
FIG. 1 is a block diagram of an image receiving apparatus connected to a removable PVC device according to an exemplary embodiment of the present invention.

FIG. 1 is a block diagram of an image receiving apparatus connected to a removable personal video recorder (PVC) device according to an exemplary embodiment of the present invention.

A removable PVC system in FIG. 1 includes an image receiving apparatus 100 and a removable PVC device 200 disposed outside of the image receiving apparatus 100. The image receiving apparatus 100 and the removable PVC device 200 are connected through a cable 10 providing a low voltage differential signaling (LVDS) interface.

The image receiving apparatus 100 according to an exemplary embodiment of the present invention transmits and receives audio/video (AV) data, user command data and various other kinds of data to and from the removable PVC device 200 through the LVDS cable 10 by using a transport stream (TS) structure. Additionally, the image receiving apparatus 100 comprises a tuner 110, a decoder 120, a display 130, a key input part 140, a controller 150 and a transmitting/receiving interface 160.

The tuner 110 receives compressed digital AV data. The decoder 120, as an MPEG decoder, decodes the received compressed digital AV data through the tuner 110. The digital image decoded by the decoder 120 is displayed on the display 130.

The key input part 140 includes keys for inputting user commands, such as recording, reproducing, suspending, continuing, moving forward, moving back, or the like.

The controller 150 transmits the compressed digital AV data, the user commands, and the information data to the removable PVR device 200 through the transmitting/receiving interface 160 according to the user commands inputted through the key input part 140.

Additionally, the controller 150 receives the compressed digital AV data, the user commands, and the information data from the removable PVR device 200 through the transmitting/receiving interface 160 according to the user commands inputted through the key input part 140.

The transmitting/receiving interface 160 provides an interface for transmitting and receiving the compressed digital AV data, and an interface for connecting the LVDS cable 10 between the image receiving apparatus 100 and the removable PVR device 200, and provides an interface such as IEEE1394 or Universal Serial Bus (USB).

The removable PVR device 200 disposed outside of the image receiving apparatus 100, comprises a communication interface 210, a central processing unit (CPU) 220, and a hard disk drive (HDD) 230.

The communication interface 210 provides an interface for transmitting the compressed digital AV data to and receiving the compressed digital AV data from the image receiving apparatus 100, and an interface for connecting the LVDS cable 10.

The CPU 220 stores the compressed digital AV data received according to the user commands received through the communication interface 210 in the HDD 230. Additionally, the CPU 220 transmits the compressed digital AV data stored in the HDD 230 according to the user commands received through the communication interface 210, storage information, and additional information to the image receiving apparatus 100 through the communication interface 210. At this time, the compressed digital AV data transmitted from the image receiving apparatus 100 is stored in the HDD 230.

As aforementioned, the image receiving apparatus 100 comprising the tuner 110, the decoder 120, the display 130, the key input part 140, the controller 150 and the transmitting/receiving interface 160 is shown and described. However, the present invention is not limited to the specific exemplary embodiments described above, and can be implemented as an image receiving apparatus comprising an interface which transmits AV data and data corresponding to user commands to an external recording device, and a controller which controls the interface so that the data corresponding to the user commands is inserted into a stream containing the AV data to be transmitted to the external recording device.

Figure 2:
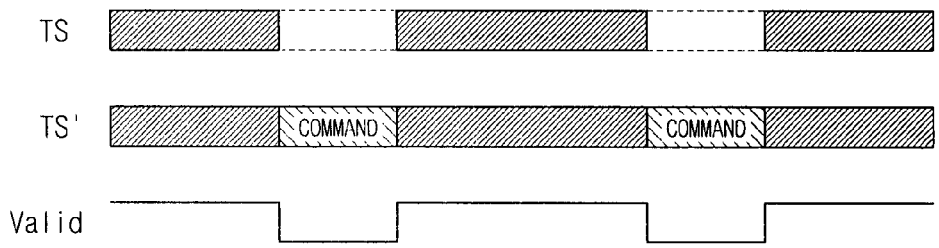
FIG. 2 is a view illustrating a method for transmitting and receiving data to/from a removable PVC device of an image receiving apparatus according to an exemplary embodiment of the present invention.

FIG. 2 is a view illustrating a method for transmitting data to and receiving data from a removable PVC device of an image receiving apparatus according to an exemplary embodiment of the present invention.

FIG. 2 illustrates transport stream (TS) data received by the tuner 110, TS' data transmitted to the removable PVC device 200 through the transmitting/receiving interface 160, and a valid signal which controls data transmission and reception in the controller 150.

The compressed digital AV data received by the tuner 110 has a TS data structure of an 8-bit unit compressed using MPEG-2. Specifically, if the valid signal of the controller 150 has a value of '1', the compressed digital AV data outputted through the tuner 110 is transmitted in packets of 188 bytes, and when the valid signal has a value of '0', the data is not transmitted.

Accordingly, the controller 150 transmits data corresponding to user commands inputted through the key input part 140 and various kinds of information to a section in which the valid signal has a value of '0'.

For example, if a recording command is inputted through the key input part 140, the controller 150 transmits the compressed digital AV data outputted through the tuner 110 in packets of 188 bytes through the transmitting/receiving interface 160 if the valid signal has a value of '1'. The controller 150 inserts the data (oblique lines of TS' data) corresponding to the recording command and the data corresponding to a title of the compressed digital AV data into the section in which the valid signal has a value of '0', and then transmits the data to the removable PVR device 200 through the transmitting/receiving interface 160. At this time, 4 or more bytes of the user command data can be inserted into the section in which the valid signal has a value of '0'.

The CPU 220, which receives the TS' data through communication interface 210, separates the recording command data, the title data, and the compressed digital AV data and stores the title data and the compressed digital AV data in the HDD 230 according to the separated recording commands.

On the other hand, if a reproducing command is inputted through the key input part 140, the controller 150 transmits the stream, which includes the data corresponding to the reproducing command and the data corresponding to the title of the AV data are inserted into the section in which the valid signal has a value of '0', to the removable PVR device 200 through the transmitting/receiving interface 160.

The CPU 220 receiving the reproducing command data and the title data through the communication interface 210 reads the compressed digital AV data corresponding to the title data among the compressed digital AV data stored in the HDD 230, and transmits the AV data in packets of 188 bytes if the valid signal has a value of '1'. Additionally, the CPU 220 inserts the data corresponding to the storage information on the storage capacity or the like and the additional information into the section in which the valid signal has a value of '0', and then transmits the data to the image receiving apparatus 100 through the communication interface 210.

The controller 150, which receives the above data through the transmitting/receiving interface 160, separates the storage information data, the additional information data, and the compressed digital AV data and transmits the separated compressed digital AV data to the decoder 120 so that the separated compressed digital AV data is decoded and displayed.

Figure 3:
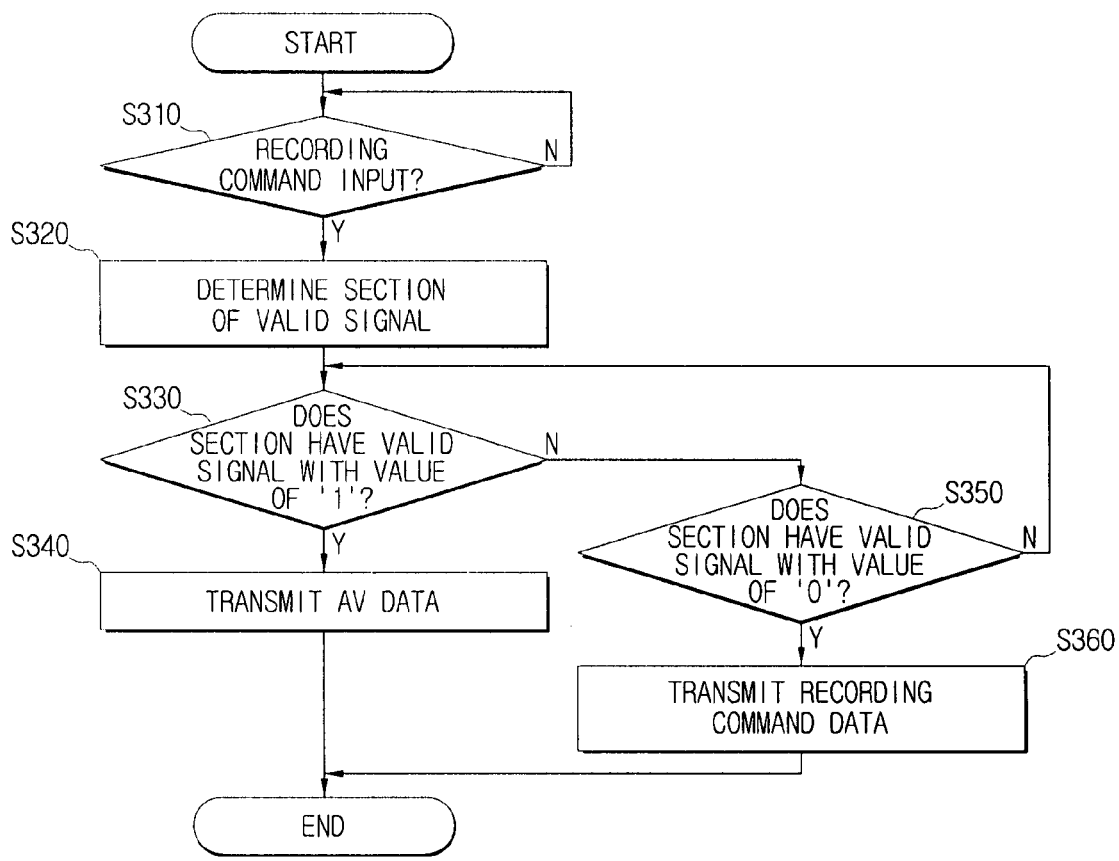
FIG. 3 is a flowchart explaining a method for transmitting and receiving data to/from a removable PVC device of an image receiving apparatus according to an exemplary embodiment of the present invention.

FIG. 3 is a flowchart explaining a method for transmitting data to and receiving data from a removable PVC device of an image receiving apparatus according to an exemplary embodiment of the present invention.

In FIG. 3, the controller 150 determines whether the recording command is inputted at operation S310. If it is determined that the recording command is inputted at operation S310-Y, the controller 150 determines the section of the valid signal at operation S320. In other words, since the valid signal has the values of '1' and '0', the controller 150 determines which one of the values is currently contained in the section of the valid signal.

The controller 150 determines whether the section has a valid signal with a value of '1' at operation S330. If it is determined that the section has a valid signal with a value of '1' at operation S330-Y, the controller 150 transmits the compressed digital AV data outputted through the tuner 110 to the removable PVR device 200 in packets of 188 bytes through the transmitting/receiving interface 160 at operation S340.

If it is determined that the section does not have a valid signal with a value of '1' at operation S330-N, the controller 150 determines whether the section has a valid signal with a value of '0' at operation S350. If it is determined that the section has a valid signal with a value of '0' at operation S350-Y, the controller 150 transmits the data corresponding to the recording command to the removable PVR device 200 through the transmitting/receiving interface 160 at operation S360.

Figure 4:
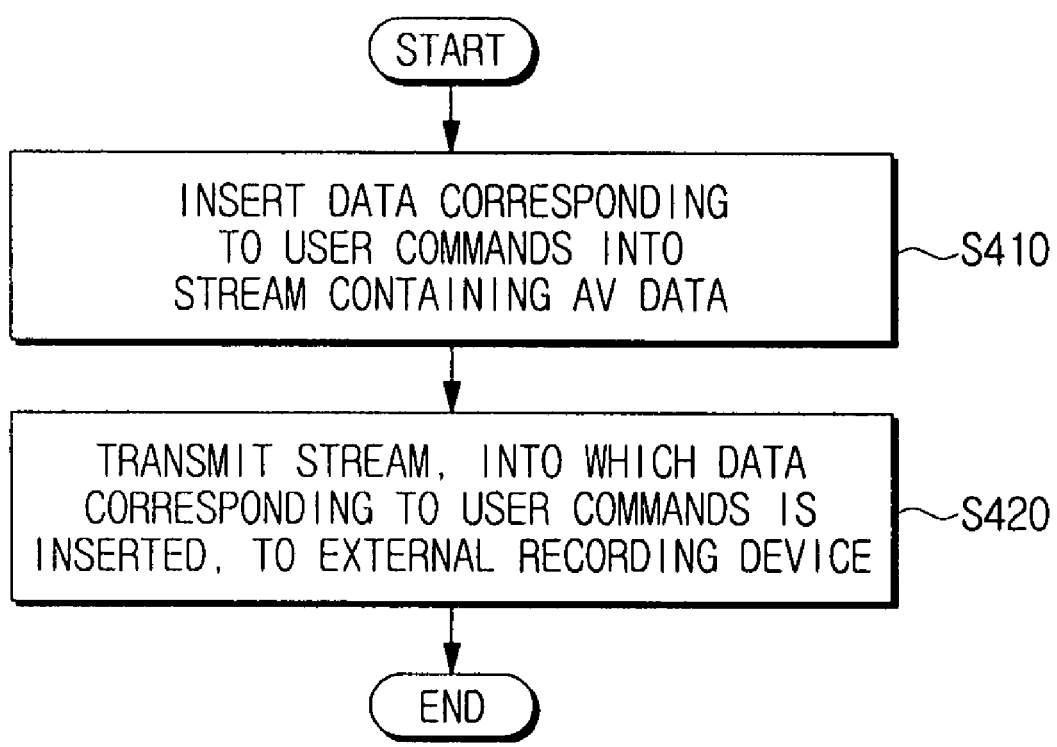
FIG. 4 is a flowchart explaining a method for transmitting and receiving data to/from a removable PVC device of an image receiving apparatus according to another exemplary embodiment of the present invention.

FIG. 4 is a flowchart explaining a method for transmitting data to and receiving data from a removable PVC device of an image receiving apparatus according to another exemplary embodiment of the present invention.

Referring to FIG. 4, the controller 150 inserts the data corresponding to the user commands into the stream containing the AV data at operation S410.

The controller 150 transmits the stream, into which the data corresponding to the user commands is inserted, to the external recording device at operation S420.

In other words, when the user commands are inputted, the controller 150 inserts the compressed digital AV data into the section having the valid signal with a value of '1' and inserts the data corresponding to the user commands into the section having the valid signal with a value of '0', and transmits and receives the data. Therefore, although all general-purpose communication lines and data lines are not connected between the image receiving apparatus and the removable PVR device, it is possible to transmit and receive data by using only data lines, such as LVDS cables.

As described above, according to exemplary embodiments of the present invention, the general-purpose communication lines and data lines are simplified so that the AV data can be stored and reproduced in the removable PVR device easily.

As aforementioned, the exemplary embodiments of the present invention are shown and described, but the present invention is not limited to the specific embodiments described above, and can be implemented in various modifications by those skilled in the art to which the present invention pertains without departing from the scope of the invention as defined by the appended claims and the full scope of equivalents thereof.

What is claimed is:

1. An image receiving apparatus comprising:
    an interface which transmits audio/video (AV) data and data corresponding to user commands to an external recording device; and
    a controller which controls the interface so that the data corresponding to the user commands is inserted into a stream containing the AV data to be transmitted to the external recording device.

2. The apparatus as claimed in claim 1, wherein the controller transmits the stream, which comprises the AV data inserted into a section having a control signal at a first level and the data corresponding to the user commands inserted into a section having the control signal at a second level, to the external recording device.

3. The apparatus as claimed in claim 2, wherein the control signal is a valid signal.

4. The apparatus as claimed in claim 2, wherein the first level is a logical level '1', and the second level is a logical level '0'.

5. The apparatus as claimed in claim 1, which is connected to the external recording device through one serial cable.

6. The apparatus as claimed in claim 5, wherein the serial cable is a low voltage differential signaling (LVDS) cable.

7. The apparatus as claimed in claim 1, wherein the external recording device comprises a removable personal video recorder (PVR) device.

8. The apparatus as claimed in claim 1, wherein the external recording device comprises:
    a communication interface which receives the stream, which includes data corresponding to user commands inserted into the stream containing the AV data, from the interface;
    a hard disk which stores the AV data; and
    a central processing unit which separates the AV data and the data corresponding to user commands from the stream, and stores the separated AV data in the hard disk according to the user commands.

9. The apparatus as claimed in claim 8, wherein the central processing unit inserts data containing storage information into the stream containing the AV data stored in the hard disk and transmits the stream to the image receiving apparatus if the user command is a reproducing command.

10. The apparatus as claimed in claim 1, wherein the controller inserts the data corresponding to the user commands into a stream that does not contain the AV data.

11. The apparatus as claimed in claim 1, wherein the stream is a transport stream (TS).

12. The apparatus as claimed in claim 2, wherein 4 or more bytes of the user command data are inserted into the section having the control signal at the second level.

13. A data transmission and reception method of an image receiving apparatus, the method comprising:
    inserting data corresponding to user commands into a stream containing audio/video (AV) data; and
    transmitting the stream, including the inserted data corresponding to the user commands, to an external recording device.

14. The method as claimed in claim 13, wherein the transmitting comprises transmitting the stream, including the AV data inserted into a section having a control signal at a first level and the data corresponding to the user commands inserted into a section having the control signal at a second level, to the external recording device.

15. The method as claimed in claim 14, wherein the control signal is a valid signal.

16. The method as claimed in claim 14, wherein the first level is a logical level '1', and the second level is a logical level '0'.

17. The method as claimed in claim 13, wherein the image receiving apparatus is connected to the external recording device through one serial cable.

18. The method as claimed in claim 17, wherein the serial cable is a low voltage differential signaling (LVDS) cable.

19. The method as claimed in claim 13, wherein the external recording device comprises a removable personal video recorder (PVR) device.

20. The method as claimed in claim 13, wherein the external recording device inserts data containing storage information into the stream containing the stored AV data and transmits the stream to the image receiving apparatus if the user command is a reproducing command.

21. The method as claimed in claim 13, wherein the stream is a transport stream (TS).

22. The method as claimed in claim 14, wherein 4 or more bytes of the user command data are inserted into the section having the control signal at the second level.

23. A removable personal video recorder (PVR) system, comprising:
    a removable PVR device which stores audio/video (AV) data; and
    an image receiving apparatus which inserts data corresponding to user commands into a stream containing the AV data and transmits the stream to the removable PVR device.

24. The system as claimed in claim 23, wherein the image receiving apparatus transmits the stream, which includes the AV data inserted into a section having a control signal at a first level and the data corresponding to the user commands inserted into a section having the control signal at a second level, to the removable PVR device.

25. The system as claimed in claim 24, wherein the control signal is a valid signal, the first level is a logical level '1' and the second level is a logical level '0'.

26. The system as claimed in claim 24, wherein the removable PVR device separates the AV data and the user command data contained in the stream which is received from the image receiving apparatus and stores the separated AV data.

27. The system as claimed in claim 23, wherein the removable PVR device transmits the stream, which includes the stored AV data inserted into the section having the control signal at the first level and the data corresponding to storage information and additional information inserted into the section having the control signal at the second level, to the image receiving apparatus if the data corresponding to the user commands is a reproducing command.

* * * * *